US012619628B2

(12) United States Patent
Galanis et al.

(10) Patent No.: US 12,619,628 B2
(45) **Date of Patent: *May 5, 2026**

(54) ANALYTICAL QUERY PROCESSING WITH DECOUPLED COMPUTE INSTANCES

(71) Applicant: Snowflake Inc., Bozeman, MT (US)

(72) Inventors: Leonidas Galanis, San Jose, CA (US); Alexander Miller, San Mateo, CA (US); William Waddington, Stateline, NV (US); Khaled Yagoub, Fremont, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,056

(22) Filed: Apr. 28, 2023

(65) Prior Publication Data

US 2023/0267130 A1     Aug. 24, 2023

Related U.S. Application Data

(63) Continuation of application No. 17/249,598, filed on Mar. 5, 2021, now Pat. No. 11,675,806.

(Continued)

(51) Int. Cl.
*G06F 16/30*          (2019.01)
*G06F 16/2452*        (2019.01)
(Continued)

(52) U.S. Cl.
CPC ...... *G06F 16/258* (2019.01); *G06F 16/24524* (2019.01); *G06F 16/24564* (2019.01);
(Continued)

(58) Field of Classification Search
CPC ...... G06F 16/258; G06F 16/27; G06F 16/256; G06F 16/24524; G06F 16/283; G06F 16/24564
See application file for complete search history.

(56) References Cited

U.S. PATENT DOCUMENTS 10,855,660 B1     12/2020     Gernhardt et al.
11,016,989 B2     5/2021     Ledbetter et al.
(Continued)

OTHER PUBLICATIONS

"U.S. Appl. No. 17/249,598, Final Office Action mailed May 31, 2022", 10 pgs.
(Continued)

*Primary Examiner* — Khanh B Pham
(74) *Attorney, Agent, or Firm* — Schwegman Lundberg & Woessner, P.A.

(57)          ABSTRACT

The subject technology receives, by a first set of decoupled compute instances of a distributed database, a plurality of transactional queries against a transactional processing database stored on a first set of decoupled storage instances, at least one of the first set of decoupled compute instances bypassing a compiler of the distributed database to process the plurality of transactional queries using locally cached data. The subject technology receives at least one select query for processing on an aggregated analytical query database of the distributed database. The subject technology generates, by the compiler of the distributed database, a query plan for execution of the at least one select query using a second set of decoupled compute instances. The subject technology generates, by the second set of decoupled compute instances, an aggregated analytical query result dataset for the at least one select query according to the query plan.

20 Claims, 10 Drawing Sheets

Related U.S. Application Data

(60) Provisional application No. 63/125,004, filed on Dec. 14, 2020.

(51) Int. Cl.

| | |
|---|---|
| *G06F 16/2455* | (2019.01) |
| *G06F 16/25* | (2019.01) |
| *G06F 16/27* | (2019.01) |
| *G06F 16/28* | (2019.01) |

(52) U.S. Cl.
CPC ............ *G06F 16/256* (2019.01); *G06F 16/27* (2019.01); *G06F 16/283* (2019.01)

(56) References Cited

U.S. PATENT DOCUMENTS

| | | | |
|---|---|---|---|
| 2005/0289129 A1 | 12/2005 | Schmitt | |
| 2013/0073513 A1 | 3/2013 | Kemper et al. | |
| 2013/0103328 A1* | 4/2013 | Sakaguchi | G01R 31/2894 |
| | | | 702/58 |
| 2014/0279839 A1 | 9/2014 | Balzar et al. | |

| | | | |
|---|---|---|---|
| 2016/0110439 A1 | 4/2016 | Hrle et al. | |
| 2017/0024433 A1* | 1/2017 | Neelakanthappa | .......................... |
| | | | G06F 16/2453 |
| 2018/0046675 A1* | 2/2018 | Zhou | G06F 16/24549 |
| 2018/0189349 A1* | 7/2018 | Sirohi | G06F 16/24539 |
| 2018/0357291 A1* | 12/2018 | Choi | G06F 16/2379 |
| 2020/0356885 A1 | 11/2020 | Geiselhart et al. | |
| 2021/0263906 A1* | 8/2021 | Bishnoi | G06F 16/24568 |
| 2022/0164351 A1* | 5/2022 | Chen | G06F 16/24542 |
| 2022/0188325 A1 | 6/2022 | Galanis et al. | |

OTHER PUBLICATIONS

"U.S. Appl. No. 17/249,598, Non Final Office Action mailed Jan. 25, 2022", 10 pgs.

"U.S. Appl. No. 17/249,598, Notice of Allowance mailed Feb. 14, 2023", 9 pgs.

"U.S. Appl. No. 17/249,598, Response filed Apr. 25, 2022 to Non Final Office Action mailed Jan. 25, 2022", 12 pgs.

"U.S. Appl. No. 17/249,598, Response filed Aug. 31, 2022 to Final Office Action mailed May 31, 2022", 11 pgs.

* cited by examiner

500

505

510

SERVER
CLUSTER

515

520

GS Cluster
SQL Compiler

FDBMD
Storage

525

530

FDBTP
Storage

500

505

510

SERVER
CLUSTER

515

520

525

530

600

605     PERFORM OLAP QUERIES

610     PERFORM OLTP QUERIES

615     REPLICATE DATA FROM OLTP TO OLAP DATABASES

620     PERFORM OLAP QUERIES THAT INCLUDE LATEST DATA FROM OLTP TRANSACTIONS

700

705　RECEIVE OLTP QUERY

710　CONFIGURE OLTP DATA TARGET

715　CHECK NODE CACHE FOR SQL

720　CACHED?

NO

730　GENERATE PLAN FROM SQL COMPILER AND METADATA

YES

725　RETREIVE FROM CACHE

735　STORE IN NODE CACHE

740　EXECUTE QUERY PLAN

ANALYTICAL QUERY PROCESSING WITH DECOUPLED COMPUTE INSTANCES

PRIORITY APPLICATIONS

This application is a continuation of U.S. patent application Ser. No. 17/249,598, filed Mar. 5, 2021, which claims priority to U.S. Provisional Application Ser. No. 63/125,004, filed Dec. 14, 2020, the disclosure of each of which is incorporated herein in its entirety by reference for all purposes.

TECHNICAL FIELD

The present disclosure generally relates to special-purpose machines that manage database data and improvements to such variants, and to the technologies by which such special-purpose machines become improved compared to other special-purpose machines for performing aggregate queries and transactional queries on a network based network-based database platform.

BACKGROUND

Databases are used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database.

Some databases can be configured for aggregated queries, in which the database undergoes a small number of transactions, but in which each transaction is complex and includes multiple computations are performed to complete the query. Other types of databases undergo a high number of small data transactions which must be accurately managed to ensure data integrity. It can be difficult to implement a single database platform that efficiently and accurately performs both aggregated queries and transactional queries in a simultaneously manner.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
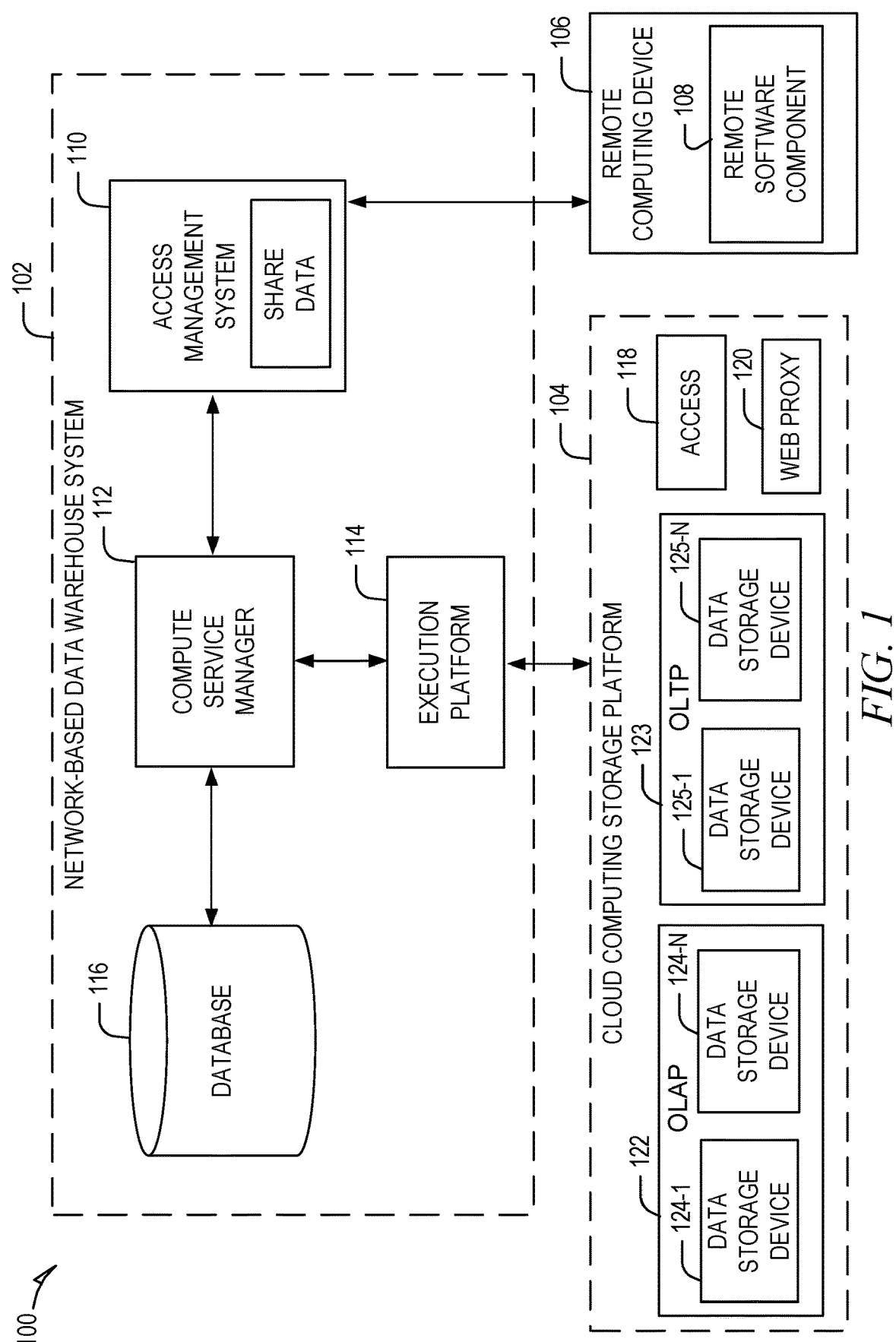
FIG. 1 is a block diagram illustrating an example computing environment in which a network-based data warehouse system can implement aggregate and transactional database systems, according to some example embodiments.

FIG. 1 illustrates an example shared data processing platform 100 in which a network-based data warehouse system 102 can be implemented for processing of aggregate and transactional database systems, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., an object storage platform, AWS® S3, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be an On-Line Transaction Processing (OLTP) database application or (On-Line Analytical Processing) OLAP database application, according to some example embodiments.

The OLTP databases is configured to manage a large number of relatively small database transactions in such a way to maintain data integrity across the database as it is accessed by a multitude of queries of different users (e.g., avoid transactional conflicts) and emphasize very fast query processing, where the effectiveness is measured by number of transactions per second, according to some example embodiments. In some example embodiments, the OLTP database can be implemented as a key-value database in which the data is managed as key-value pairs (e.g., FoundationDB). The key—value store is a data storage approach designed for storing, retrieving, and managing associative arrays, and a data structure more commonly known today as a dictionary or hash table. The dictionaries contain a collection of objects that have many different fields within each object, where each contains data. The OLTP records are stored and retrieved using a key that uniquely identifies a given record, and is used to find the data within the OLTP database.

The online analytical processing database is a data structure or data warehouse configured for a relatively small number of complex transactions. OLAP queries are often complex and involve aggregations. For OLAP database systems, the emphasis can be the response time as an effectiveness measure for completing the complex queries. The OLAP database can be configured as a multidimensional database that has one or more hierarchies or formula-based relationships of data within each dimension. Aggregation or consolidation of data in the OLAP database involves computing all of these data relationships for one or more dimensions, for example, adding up all subsets (e.g., Employee Department Data) to get total for the complete set (e.g., Total Employee Department data).

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users. In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices (e.g., data storage devices 124-1 to 124-N, data storage devices 125-1 to 125-N) that are part of a cloud computing storage platform 104. In some embodiments, data storage devices are cloud-based storage devices located in one or more geographic locations. For example, data storage devices may be part of a public cloud infrastructure or a private cloud infrastructure. Data storage devices may be hard disk drives (HDDs), solid state drives (SSDs), storage clusters, object storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N and data storage devices 125-1 to 125-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

In some example embodiments, data devices 124-1 to 124-N of database 122 are data stores for an aggregate query database (e.g., OLAP data stores 445, discussed further below with reference to FIG. 4). In some example embodiments, data storage devices 125-1 to 125-N of database 123 are data stores for a transactional database (e.g., OLTP data stores 440, discussed further below with reference to FIG. 4). In the example of FIG. 1, cloud computing storage platform hosts both of the databases 122 and 123. In some other example embodiments, the databases can be provided on different cloud platforms. For example, database 122 can be provided by cloud computing storage platform 104, and database 123 can be provided by an additional cloud computing platform that is separate from the cloud computing storage platform 104. Additionally, in some example embodiments, database 123 is integrated within the network-based warehouse system 102 (e.g., database 116).

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing device 106 may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, may be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-$n$ in the cloud computing storage platform 104. Thus, the computing resources and cache resources are not restricted to specific data storage devices 124-1 to 124-$n$. Instead, all computing resources and all cache resources may retrieve data from, and store data to, any of the data storage resources in the cloud computing storage platform 104.

Figure 2:
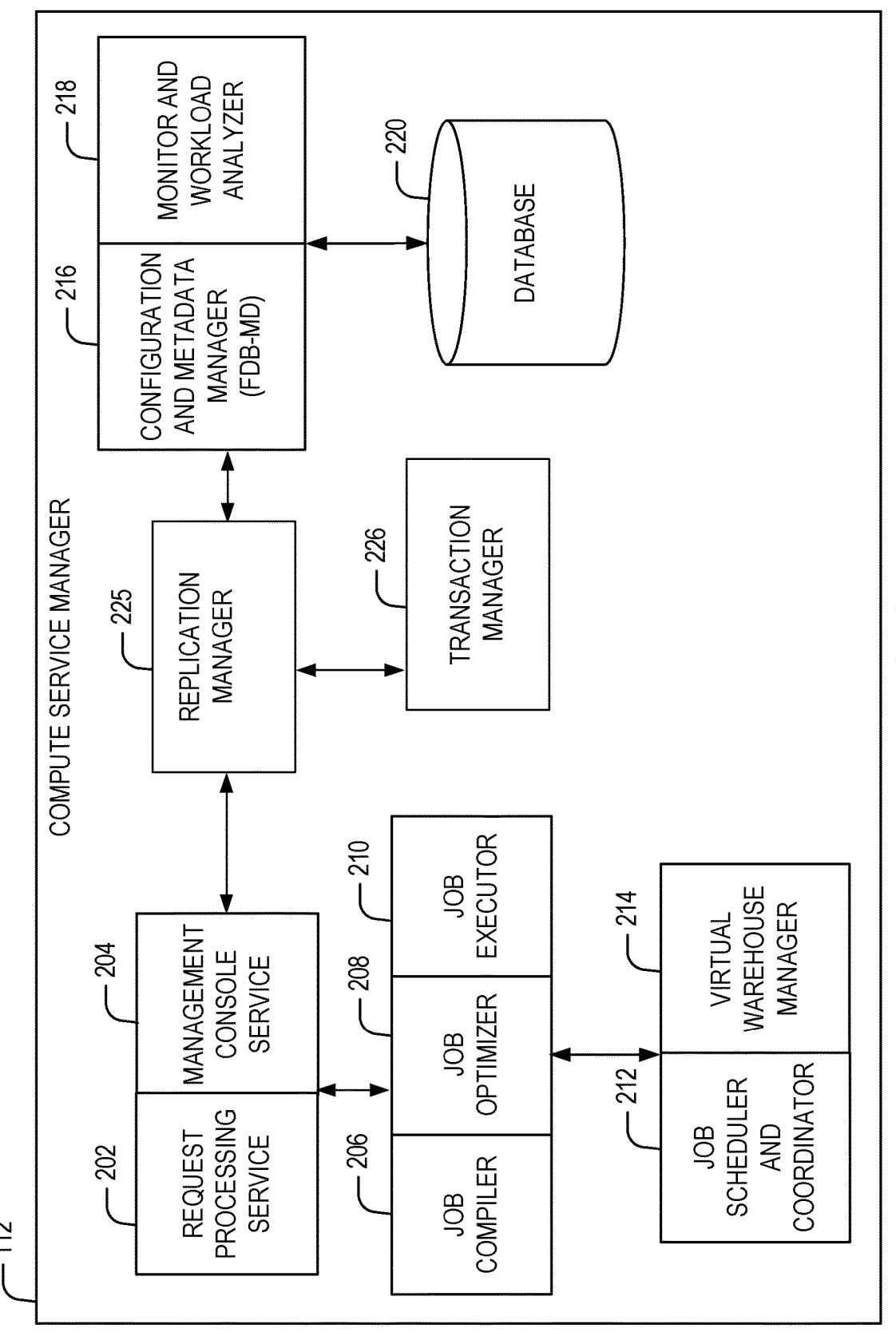
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The replication manager 225 manages transmission of database data, such as replicating database data to one or more secondary databases, according to some example embodiments. In some example embodiments, the replication manager 225 comprises a serialization layer that can serialize data from an Online Analytical Processing (OLAP) database (e.g., object storage) to generate key value stores for storage in an Online Transactional Processing (OLTP) database for access by transactional queries. Further, the serialization layer can replicated data from the key values stores of the OLTP database for storage in an OLAP database. The transaction manager 226 manages concurrency and processing of transactional queries on transactional datastores.

In some example embodiments, the compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. The data storage device 220 in FIG. 2 represents any data storage device within the network-based data warehouse system 102. For example, data storage device 220 may represent caches in execution platform 114, storage devices in cloud computing storage platform 104, or any other storage device.

Figure 3:
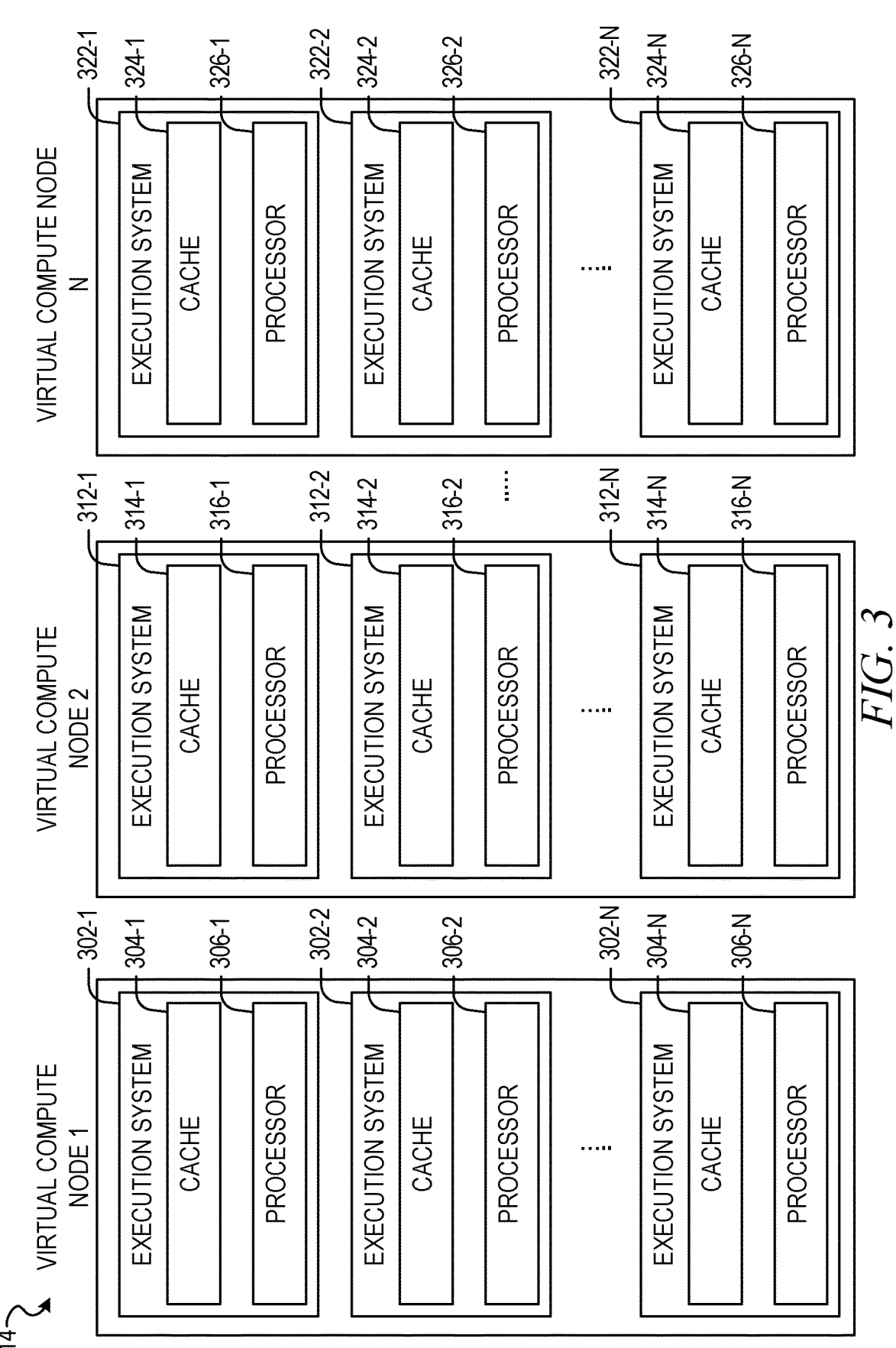
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices shown in FIG. 1 (e.g., one or more of data storage devices 124-1 to 124-N and data storage devices 125-1 to 125-N). Thus, the virtual warehouses are not necessarily assigned to a specific data storage device and, instead, can access data from any of the data storage devices within the cloud computing storage platform 104. Similarly, each of the execution nodes shown in FIG. 3 can access data from any of the data storage devices. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., objects recently accessed by the given node). In some example embodiments, the cache stores file headers, and individual columns of files as a query downloads only columns useful for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that make use of significant computing resources. Another execution node may contain significant cache resources and minimal computing resources, making this execution node useful for tasks that may use caching of large amounts of data. Yet another execution node may contain cache resources providing faster input-output operations, useful for tasks that make use of fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node may use a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
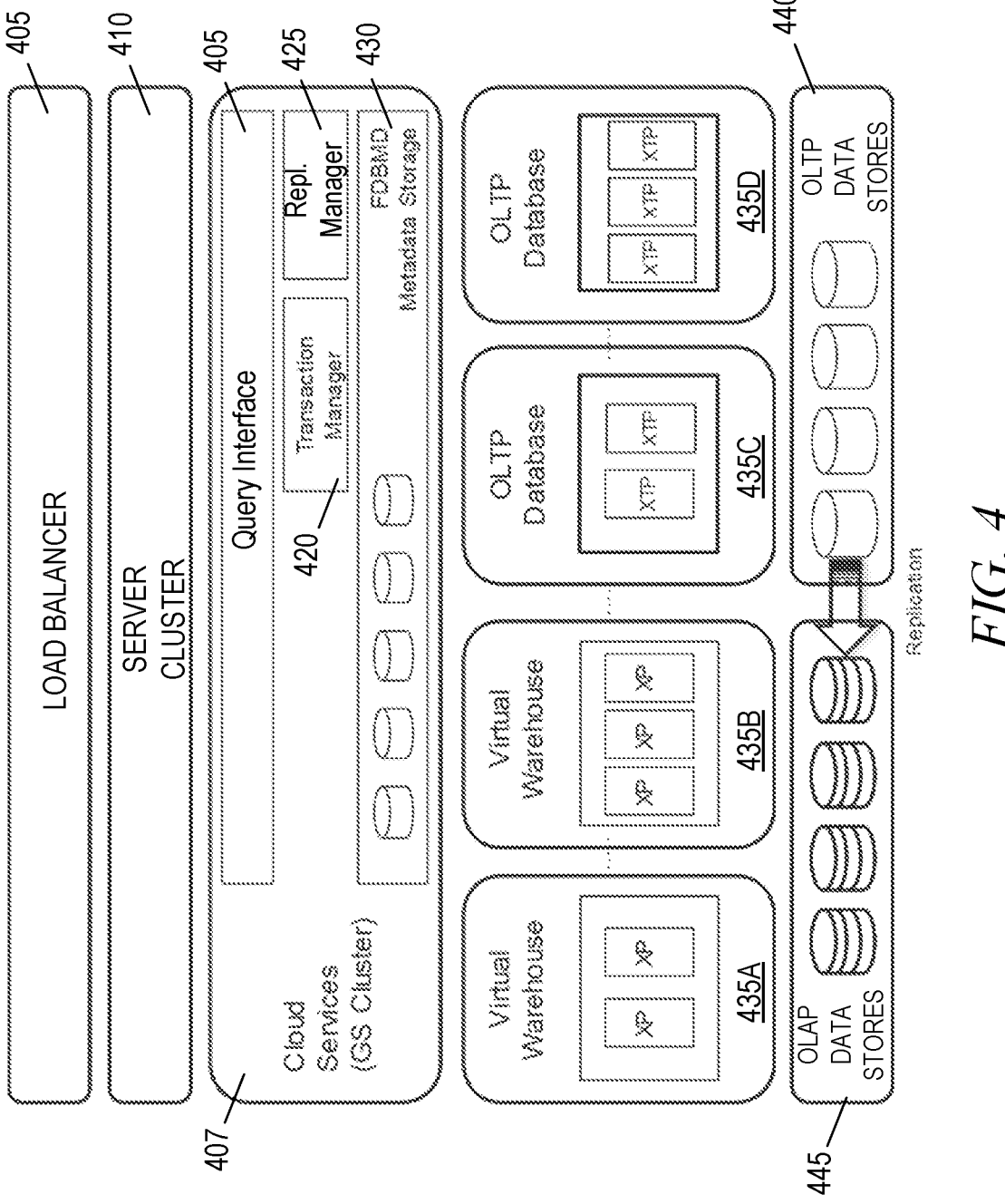
FIG. 4 shows a hybrid aggregate and transactional query architecture, according to some example embodiments.

FIG. 4 shows a hybrid aggregate and transactional query architecture 400, according to some example embodiments. As illustrated in the example of FIG. 4, one or more client devices such as remote computing device 106 (FIG. 1) can interact with the architecture 400 via an interface such as a load balancer 405 (e.g., Amazon Elastic Load Balancer) that processes traffic through a server, such as a server cluster 410 (e.g., high-availability (HA) server cluster, an NGINX cluster). Queries received by the server cluster 410 can be further processed by a cloud services layer 407 (global services cluster) which can include different processing components of the compute service manager 112 as discussed in FIG. 1 and FIG. 2. In some example embodiments, the query interface receives a query and routes them via two different computing components based on whether the query is an OLAP query or an OLTP query. In the architecture 400, a plurality of compute nodes 435A-435D can process the queries. In some example embodiments, a first set of compute nodes (e.g., node 435A, node 435B, etc.) process the OLAP traffic and a second set of compute nodes (e.g., node 435C, node 435D, etc.) process the OLTP traffic. The metadata storage layer 430 (e.g., managed by configuration and metadata manager 216, FIG. 2) manages the metadata storage in a database such as a foundation database to track metadata for the different compute instances, as discussed above in FIG. 2 and FIG. 3.

In some example embodiments, the transaction manager 420 (e.g., transaction manager 226, FIG. 2) manages concurrency and processing of OLTP queries, as discussed further in Application Ser. No. 63/081,611, filed on Sep. 22, 2020, titled "Concurrent Transaction Processing in a Database System", which is hereby incorporated in its entirety. The replication manager 425 (e.g., replication manager 225, FIG. 2) manages replicating traffic written by the OLTP nodes in the OLTP data stores 440 to the OLAP data stores 445 (e.g., object storage devices). In some example embodiments, the replication manager 225 replicates the data from the OLTP data stores 440 to the OLAP data stores 445 in response to an OLAP query. For example, to ensure the OLAP query accesses the most recent data (e.g., updates performed via OLTP transactions), a OLAP query plan is received and the most-up-to-date data in the OLTP data stores 440 is flushed to the OLAP data stores 445, followed by completion of the OLAP query plan. In alternative example embodiments, an OLAP query accesses the latest OLTP data by pulling data related to the query from the OLAP data stores 445 (e.g., current or latest OLAP data), and also pulling data related to the query from the OLTP data stores 440 (e.g., most-up-to-date transactional OLTP data), and performing a merge process to merge the data from the two data stores, followed by executing the query plan on the merged dataset.

In some example embodiments, the OLTP data stores 440 and the metadata storage layer 430 are implemented as different separate FoundationDB Databases (FDB) instances (e.g., an FDB metadata store (FDBMD), and an FDB transactional processing data store (FDBTP)), using key-value stores. In some example embodiments, the transaction manager performs OLTP operations on the OLTP data stores 440, where the OLTP data is stored in a key value (KV) table in FDB format. The replication manager 425 periodically or continuously replicates the KV table data from the OLTP data stores 440 to the OLAP data stores 445, in which the KV table data is stored in a FDN format (e.g., formatted in micro-partitions tracked by metadata in metadata storage layer 430, for access by the OLAP nodes 435A, and 435B with other data in the object store that was previously stored and managed by the metadata in metadata storage layer 430).

In this way, complex aggregated OLAP queries (e.g., SELECT statements with aggregated computation across multiple dimensions) can be processed by the architecture 400 via compute nodes 435A and 435B, where the data queried for the complex processing is continuously updated from smaller OLTP transactions made to the OLTP data stores 440 and replicated by the replication manager 425 to the OLAP data stores 445.

Figure 5A:
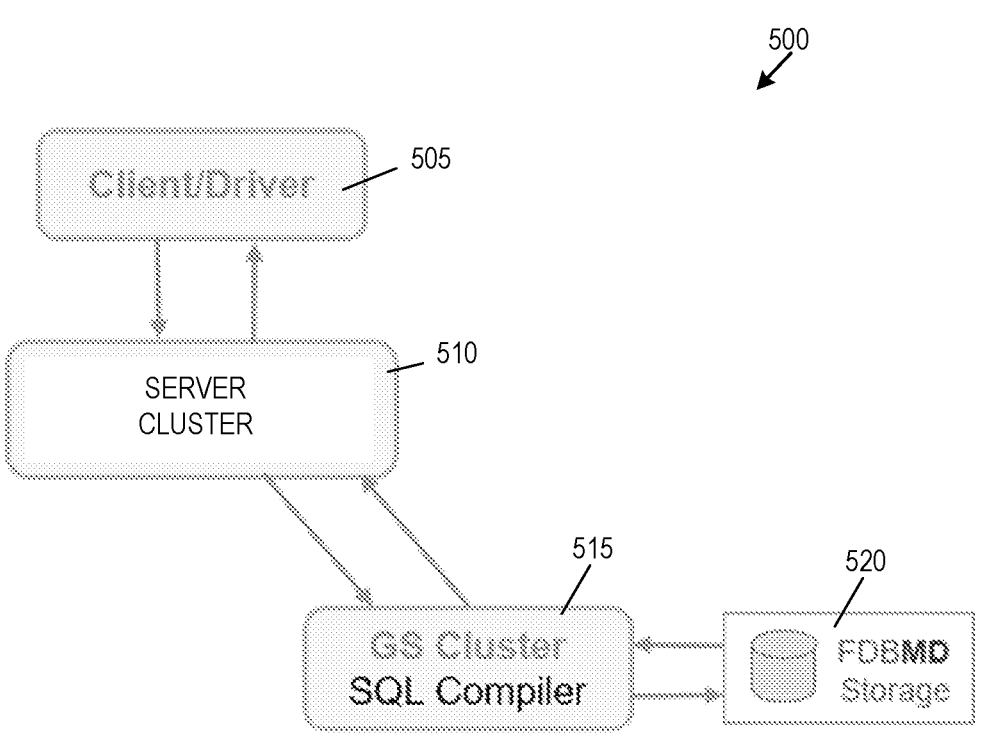
FIG. 5A-5C show example transactional data flows, according to some example embodiments.
Figure 5A:
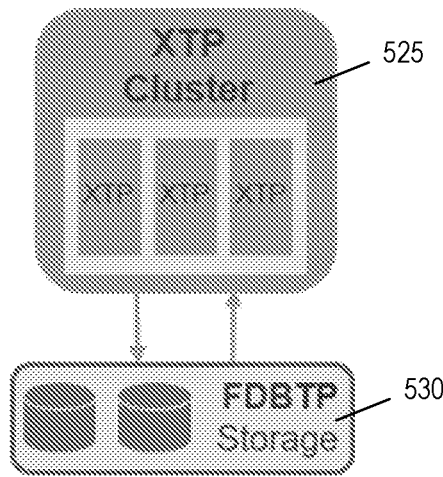
Figure 5B:
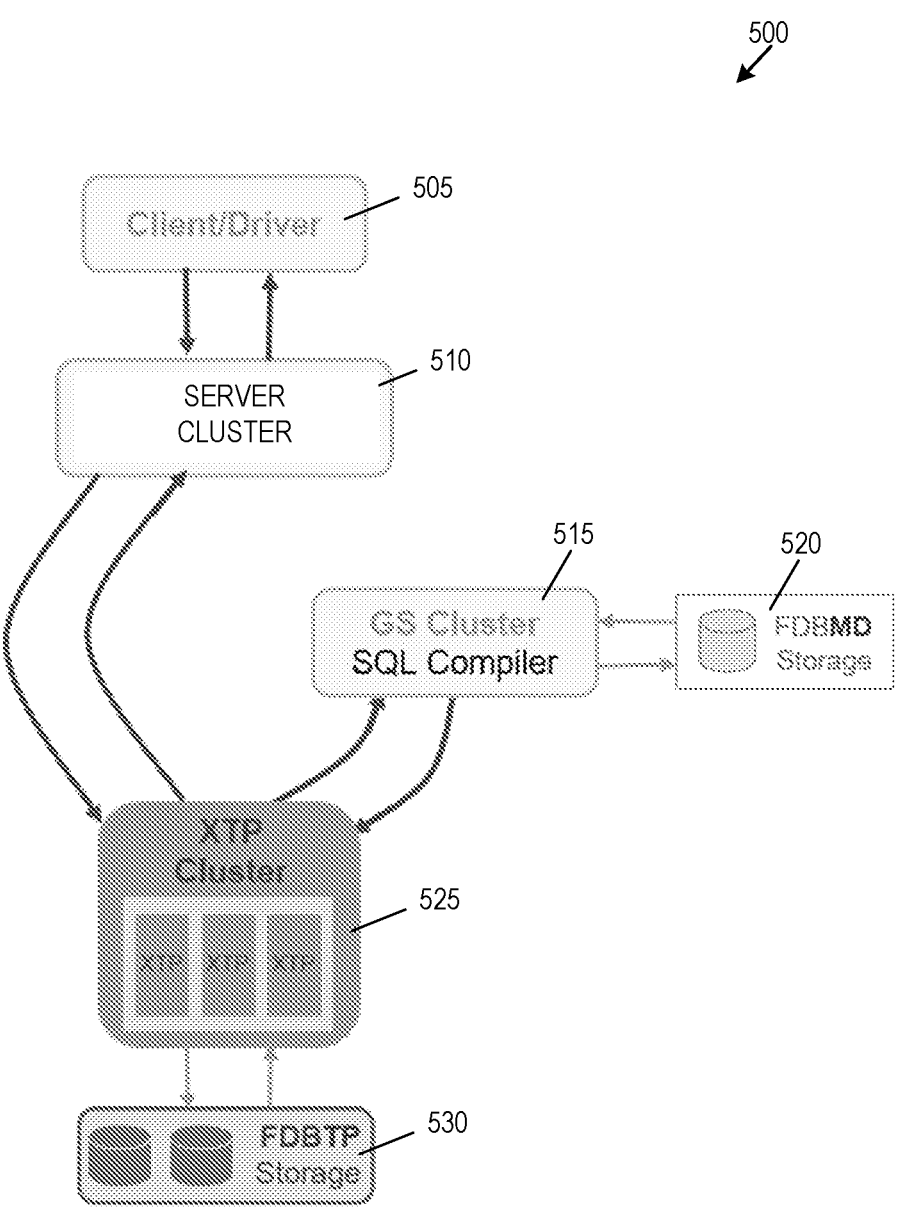
Figure 5C:
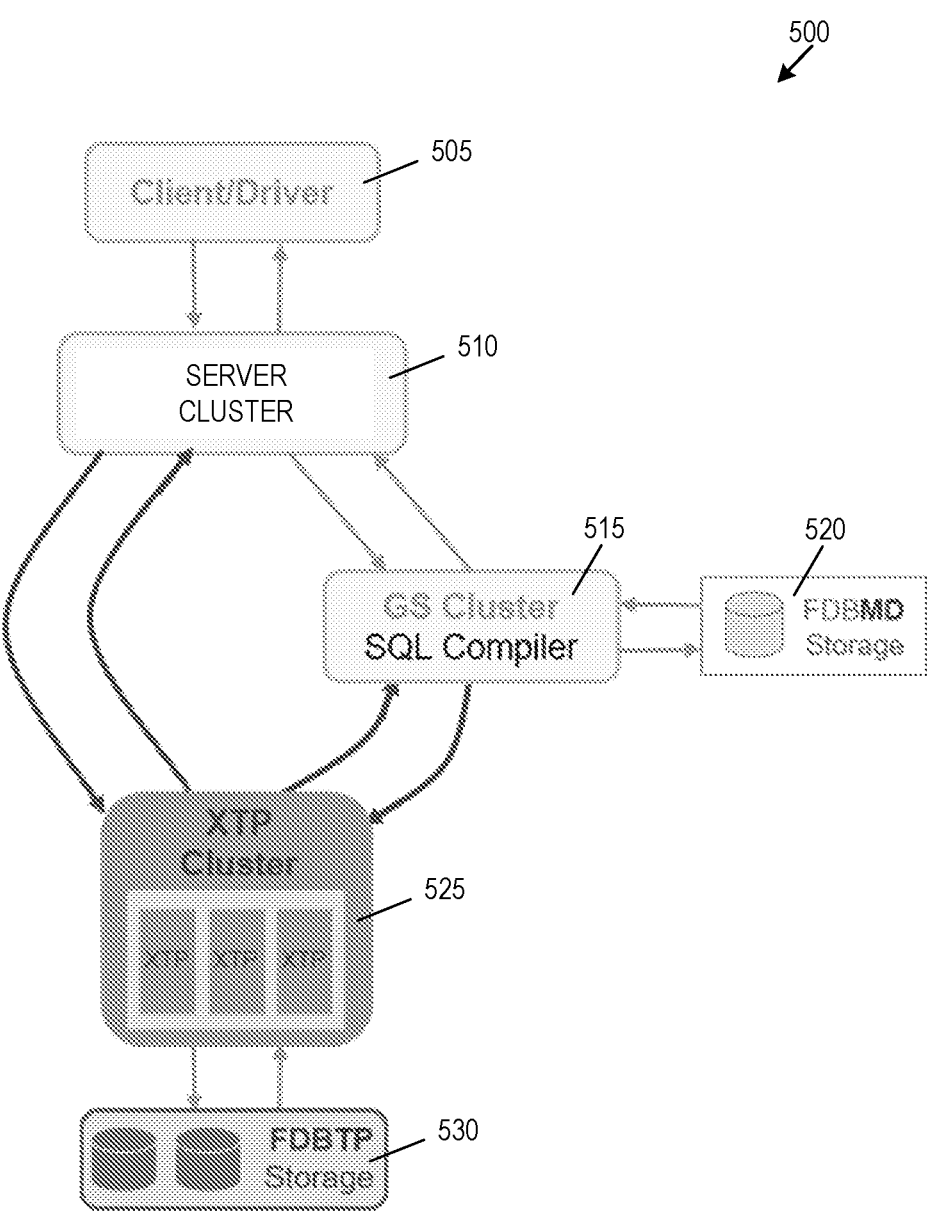

FIGS. 5A to 5C show an example processing data architecture 500 for processing of OLTP queries, according to some example embodiments. The architecture provides low latency requests in which a direct channel is established to an OLTP compute instance (e.g., node 435C, node 435D), where an SQL compiler in the global services cluster is bypassed to increase the speed after first execution of the query. With reference to FIG. 5A, the client device 505 (e.g., client device, user device, driver) can connect to the architecture 400 via the server cluster 510. For example, a user of a remote computing device 106 connects to the network-based data warehouse system 102 over a network and uses a login link to login and authenticate via a username and password. The client device 505 can perform different tasks such as creating database objects (e.g., a database schema, tables, views). The client device 505 can further create OLTP compute clusters (e.g., node 435C, node 435D), according to some example embodiments. In the first execution displayed FIG. 5A, the client device 505 issues command to use the OLTP cluster 525 to perform processing (e.g., "use warehouse <xtp-cluster-name>", which references a cluster including decoupled compute instances such as node 435C and node 435D). Global services cluster 515 receives the request and sets client session's current warehouse to the warehouse specified in the command (e.g., "<xtp-cluster-name>"). Global services cluster 515 then sends the XTP target endpoint (e.g., XTP cluster URL) back to the client device 505. The client device 505 then uses the XTP endpoint or URL for subsequent OLTP processes in the active session.

For example, with reference to FIG. 5B, the OLTP cluster 525 can receive a request from the client device 505 and check the cache within the OLTP cluster 525 to determine whether the cache contains an execution plan of statements already compiled and/or previously executed. If the SQL statements are present in the cache, the execution plan is retrieved, re-executed against the OLTP data store 530 (e.g., FDB instance dedicated to XTP nodes that process OLTP database transactions, OLTP data stores 440), and the resulting rows are returned to the client device 505.

Alternatively, if the SQL does not exist in the cache of the OLTP cluster 525 (e.g., cache of a node of the cluster), then the request is sent to the global services cluster 515 for compilation and plan generation using metadata managed by metadata store 520 (e.g., metadata storage layer 430, FIG. 4). After the plan is generated, the statements of the plan are cached in the SQL cache of the OLTP cluster 525 and then executed as illustrated in FIG. 5C. In this way, the OLTP queries avoid interacting with global services cluster 515 after the SQL cached thereby increasing OLTP processing speed.

Figure 6:
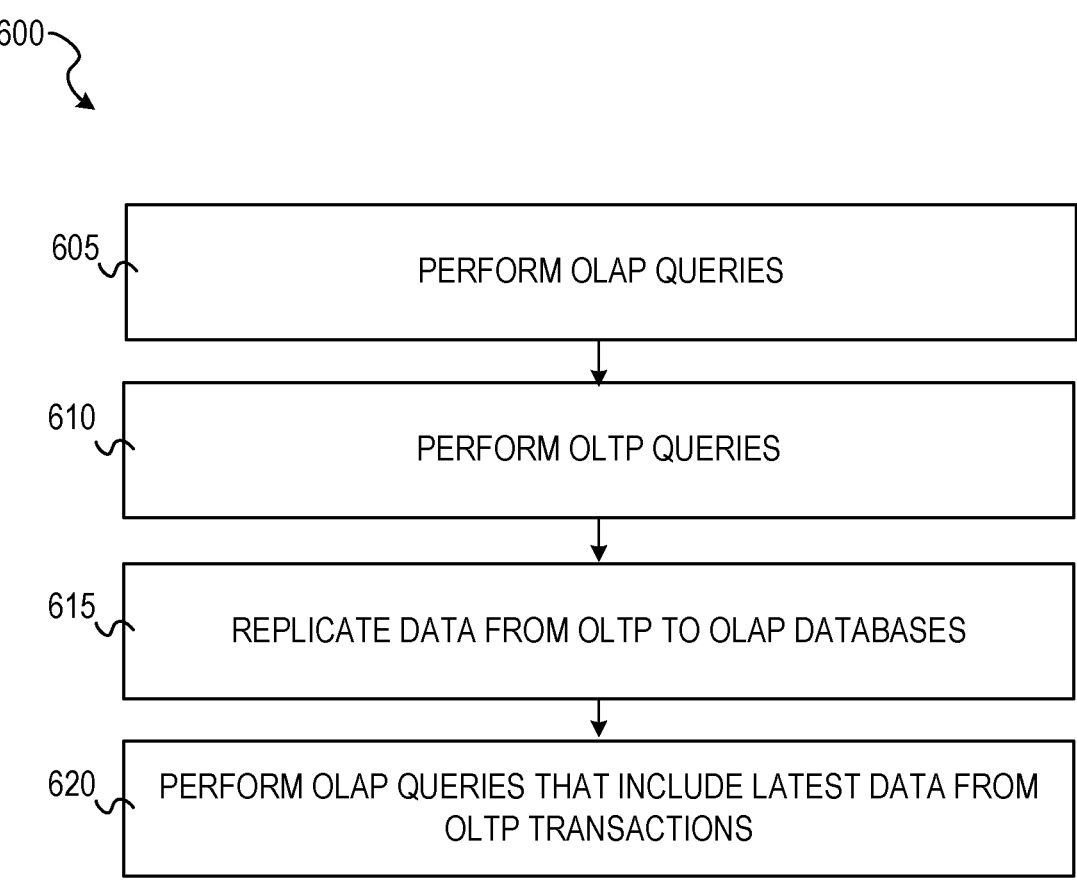
FIG. 6 shows a flow diagram for performing transactional and aggregate queries, according to some example embodiments.

FIG. 6 shows a flow diagram of method 600 for performing OLTP and OLAP queries, according to some example embodiments. At operation 605, the network-based data warehouse system 102 performs OLAP queries. For example, node 435A or 435B receive an OLAP query and generate results from the OLAP data stores 445 which is continuously updated from OLTP data replicated from OLTP data stores 440. At operation 610, the network-based data warehouse system 102 performs OLTP queries. For example, the transaction manager 420 manages a high volume of small data transactions performed against OLTP data stores 440. In some example embodiments, operations 605 and 610 are performed simultaneously by different sets of decoupled compute instances, as discussed above with reference to FIG. 4. At operation 615, the data is replicated from the OLTP data stores 440 to the OLAP data stores 440 by the replication manager 425. At operation 620, additional OLAP queries are performed by the data warehouse system 102, which includes data from replicated from the latest OTLP changes from the OLTP data stores 440 that are replicated into the OLAP data stores 445 and included as query results for the additional OLAP queries of operation 620.

Figure 7:
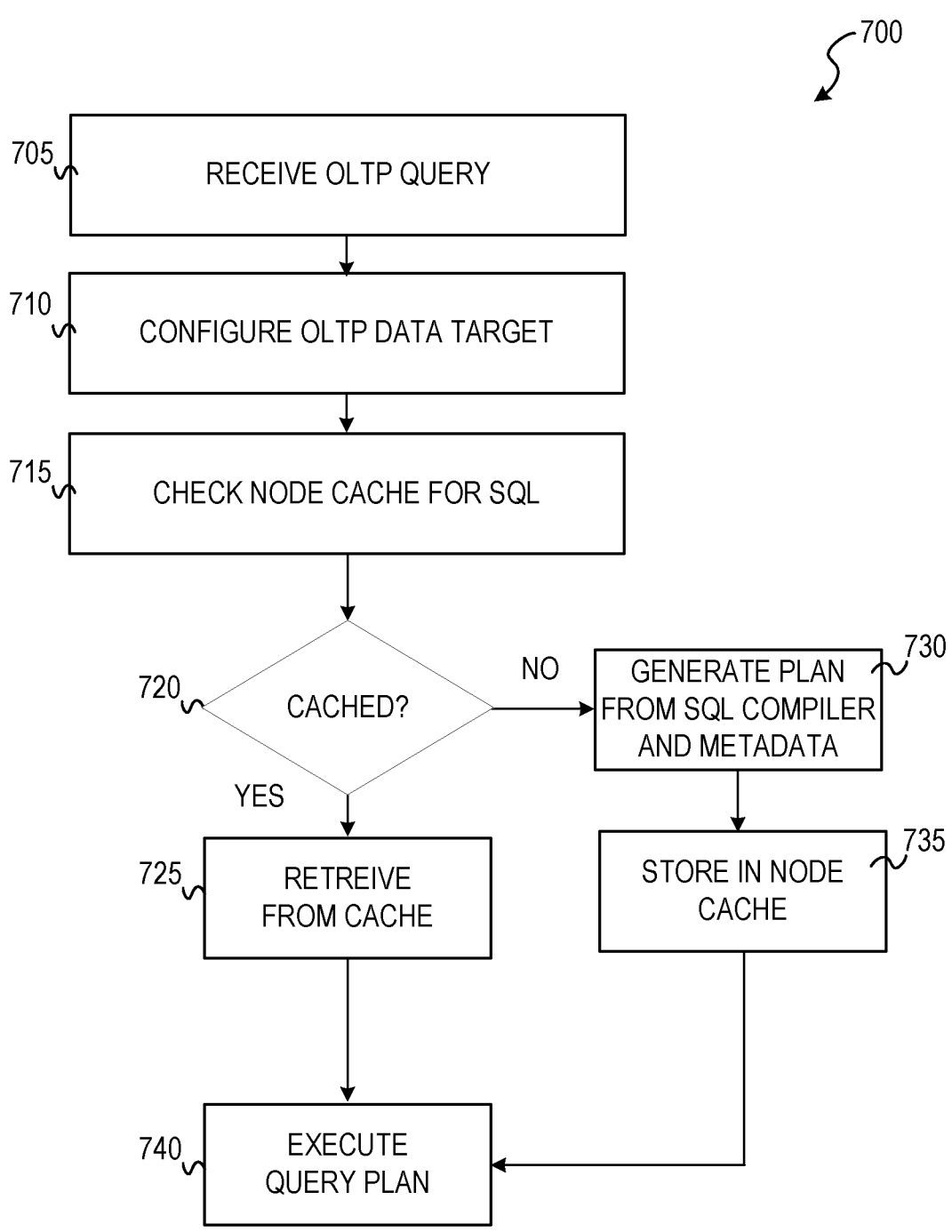
FIG. 7 shows a flow diagram of a method for performing transactional queries using the hybrid architecture, according to some example embodiments.

FIG. 7 shows a flow diagram of a method 700 for performing OLTP queries using the hybrid architecture 400, according to some example embodiments. At operation 705, the server interface receives a query from the client device. For example, the server cluster 510 receives a query from the client device 505. At operation 710, the OLTP data target is configured. For example, the global services cluster 515 receives a specified warehouse from the client device 505 and sets the session's current warehouse to the specified warehouse or cluster (e.g. OLTP cluster 525. At operation 715, one or more nodes of the specified warehouse determines whether the SQL for the query are cached (e.g., in cache of node 435C). At operation 720, if the cache contains the SQL statements, then the node retrieves the SQL at operation 725 and completes the query according to the query plan at operation 740 without further interfacing with the global services cluster 515. Alternatively, at operation 720 if the SQL is not cached, then the node contacts the global services cluster 515 to generate a plan using the SQL compiler and the distributed metadata at operation 730. At operation 735, the generated plan is then cached in the node, and then executed by the node at operation 740.

Figure 8:
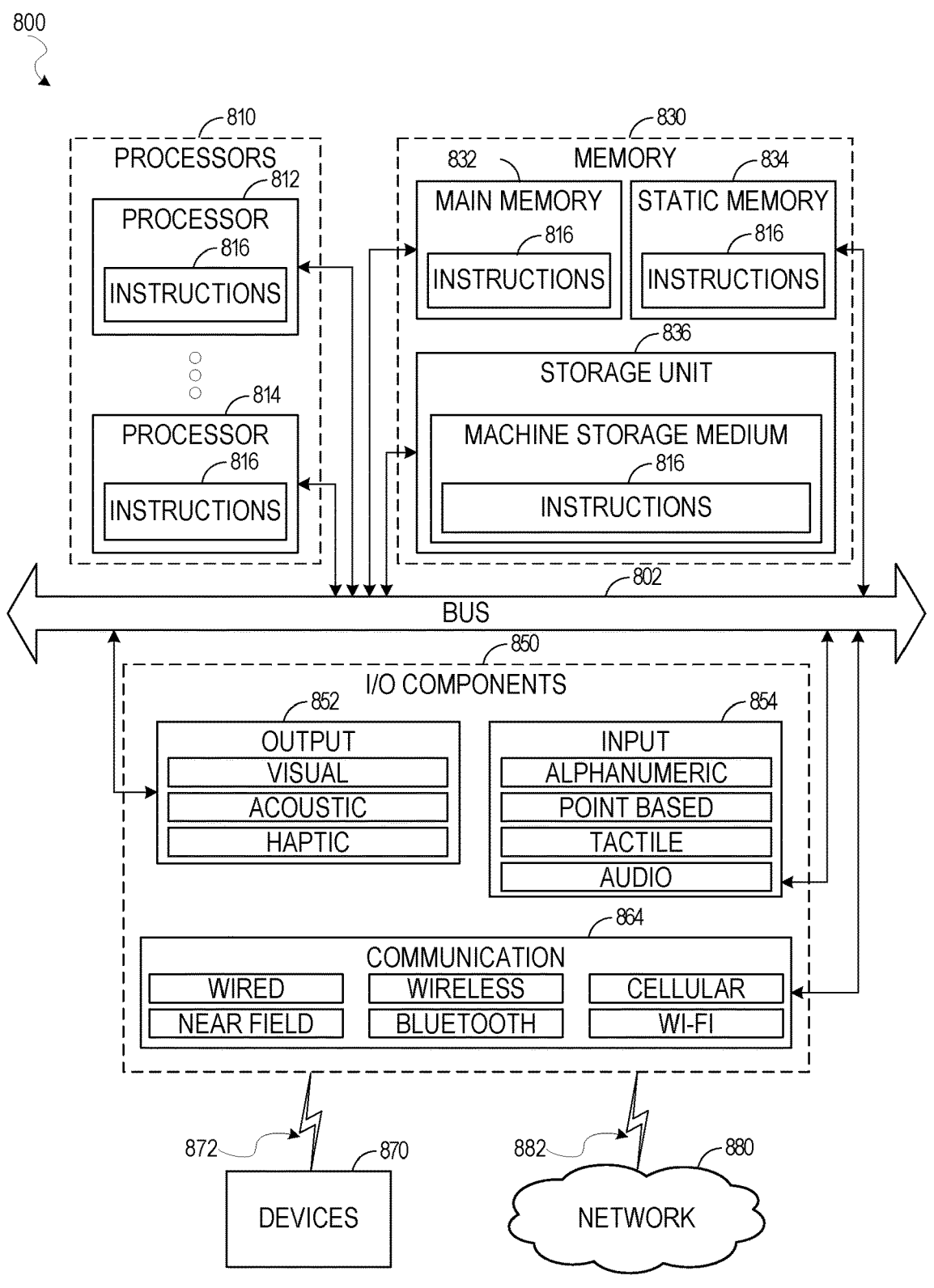
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of any one or more of the methods 600 and 700. In this way, the instructions 816 transform a general, non-programmed machine into a particular machine 800 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on.

The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the remote computing device 106, the access management system 110, the compute service manager 112, the execution platform 114, the access management system 118, the Web proxy 120, and the devices 870 may include any other of these systems and devices.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 600 and 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

The following numbered examples are embodiments: Example 1.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

In view of the disclosure above, various examples are set forth below. It should be noted that one or more features of an example, taken in isolation or combination, should be considered within the disclosure of this application.

Example 1. A method comprising: receiving, by a first set of decoupled compute instances of a distributed database, a plurality of transactional queries against a transactional processing database, each of the plurality of transactional queries comprising data manipulation language statements that change data in the transactional processing database; replicating the changed data from the transactional processing database to an object store database of an aggregated analytical query database managed by a second set of decoupled compute instances of the distributed database; receiving one or more select queries against the aggregated analytical query database; and generating, by the second set of decoupled compute instances, aggregated analytical query result dataset for the one or more select queries in response to the one or more select queries.

Example 2. The method of example 1, wherein the transactional processing database is an Online Transactional Processing (OLTP) database that tracks a large volume of data transactions, and wherein the aggregated analytical query database is an Online Analytical Processing (OLAP) database comprising aggregated queries and a low volume of data transactions relative to the OLTP database.

Example 3. The method of any of examples 1 or 2, further comprising: receiving a query and determining whether the query an OLTP query or an OLAP query.

Example 4. The method of any of examples 1-3, further comprising: in response to the query being the OLAP query, directing the query to the OLAP database and processing the query using the second set of decoupled compute instances.

Example 5. The method of any of examples 1-4, further comprising: in response to the query being the OLTP query, directing the query to the OLAP database and processing the query using the first set of decoupled compute instances.

Example 6. The method of any of examples 1-5, wherein each of the first set of compute instances and the second set of compute instances are virtual machines.

Example 7. The method of any of examples 1-6, wherein the changed data is stored in a key value table that is replicated from the transactional processing database to the aggregated analytical query database.

Example 8. A system comprising: one or more processors of a machine; and a memory storing instructions that, when executed by the one or more processors, cause the machine to perform operations comprising: receiving, by a first set of decoupled compute instances of a distributed database, a plurality of transactional queries against a transactional processing database, each of the plurality of transactional queries comprising data manipulation language statements that change data in the transactional processing database; replicating the changed data from the transactional processing database to an object store database of an aggregated analytical query database managed by a second set of decoupled compute instances of the distributed database; receiving one or more select queries against the aggregated analytical query database; and generating, by the second set of decoupled compute instances, aggregated analytical query result dataset for the one or more select queries in response to the one or more select queries.

Example 9. The system of any of example 8, wherein the transactional processing database is an Online Transactional Processing (OLTP) database that tracks a large volume of data transactions, and wherein the aggregated analytical query database is an Online Analytical Processing (OLAP) database comprising aggregated queries and a low volume of data transactions relative to the OLTP database.

Example 10. The system of any of examples 8 or 9, the operations further comprising: receiving a query and determining whether the query an OLTP query or an OLAP query.

Example 11. The system of any of examples 8-10, the operations further comprising: in response to the query being the OLAP query, directing the query to the OLAP database and processing the query using the second set of decoupled compute instances.

Example 12. The system of any of examples 8-11, the operations further comprising: in response to the query being the OLTP query, directing the query to the OLAP database and processing the query using the first set of decoupled compute instances.

Example 13. The system of any of examples 8-12, wherein each of the first set of compute instances and the second set of compute instances are virtual machines.

Example 14. The system of any of examples 8-13, wherein the changed data is stored in a key value table that is replicated from the transactional processing database to the aggregated analytical query database.

Example 15. A computer-storage medium embodying instructions that, when executed by a machine, cause the machine to perform operations comprising: receiving, by a first set of decoupled compute instances of a distributed database, a plurality of transactional queries against a transactional processing database, each of the plurality of transactional queries comprising data manipulation language statements that change data in the transactional processing database; replicating the changed data from the transactional processing database to an object store database of an aggregated analytical query database managed by a second set of decoupled compute instances of the distributed database; receiving one or more select queries against the aggregated analytical query database; and generating, by the second set of decoupled compute instances, aggregated analytical query result dataset for the one or more select queries in response to the one or more select queries.

Example 16. The computer-storage medium of example 15, wherein the transactional processing database is an Online Transactional Processing (OLTP) database that tracks a large volume of data transactions, and wherein the aggregated analytical query database is an Online Analytical Processing (OLAP) database comprising aggregated queries and a low volume of data transactions.

Example 17. The computer-storage medium of any of examples 15 or 16, the operations further comprising: receiving a query and determining whether the query an OLTP query or an OLAP query.

Example 18. The computer-storage medium of any of examples 15-17, the operations further comprising: in response to the query being the OLAP query, directing the query to the OLAP database and processing the query using the second set of decoupled compute instances.

Example 19. The computer-storage medium of any of examples 15-18, the operations further comprising: in response to the query being the OLTP query, directing the query to the OLAP database and processing the query using the first set of decoupled compute instances.

Example 20. The computer-storage medium of any of examples 15-19, wherein each of the first set of compute instances and the second set of compute instances are virtual machines.

What is claimed is:

1. A method comprising:

assigning, by a first cluster, a session of a client device to a first set of decoupled compute instances, the first cluster, prior to assigning the session, receiving a request from the client device to use the first set of decoupled compute instances, each of the decoupled compute instances comprising an execution node, the execution node being included in a second cluster that is separate from the first cluster;

after assigning the session, receiving from the client device, by the first set of decoupled compute instances, a plurality of transactional queries against a transactional processing database stored on a first set of decoupled storage instances, at least one of the first set of decoupled compute instances bypassing a compiler to process at least one transactional query from the plurality of transactional queries using locally cached data in a cache provided by the second cluster;

determining, by the second cluster, that a compiled execution plan of statements, corresponding to a particular transactional query from the plurality of transactional queries, does not exist in the cache provided by the second cluster;

sending, by the second cluster, the particular transactional query to a third cluster for compiling and generating an execution plan of the particular transactional query, the third cluster being separate from the first cluster and the second cluster, wherein the second cluster processes OLTP traffic and performs OLTP operations on transactional data stores, and the third cluster includes SQL compiler functionality for generating query plans, the clusters being implemented with separate compute nodes;

receiving at least one select query for processing on an aggregated analytical query database, the aggregated analytical query database included in the third cluster that is separate from the first cluster and the second cluster;

generating, by the compiler included in the third cluster, a query plan for execution of the at least one select query using a second set of decoupled compute instances; and generating, by the second set of decoupled compute instances, an aggregated analytical query result dataset for the at least one select query according to the query plan.

2. The method of claim 1, wherein the first cluster comprises a server cluster, the second cluster comprises an OLTP cluster, the third cluster comprises a global services cluster, and further comprising:

receiving a transactional query for processing on transactional data in the transactional processing database;

determining that the transactional data is cached on the first set of decoupled compute instances; and generating transactional results data by applying the transactional query on the transactional data, the first set of decoupled compute instances bypassing the compiler in generating the transactional results data and returning results to a client device that generated the transactional query, the bypassing comprising setting an active session between the client device and the first set of decoupled compute instances.

3. The method of claim 1, further comprising:

replicating data that has changed from the transactional processing database to an object store database of an aggregated analytical query database managed by the second set of decoupled compute instances.

4. The method of claim 3, wherein the aggregated analytical query database is stored on a second set of decoupled storage instances, the second set of decoupled compute instances being remote from the second set of decoupled storage instances.

5. The method of claim 1, wherein the first set of decoupled compute instances is remote from the first set of decoupled storage instances, each of the plurality of transactional queries comprising data manipulation language statements that change data in the transactional processing database.

6. The method of claim 1, wherein the transactional processing database is an Online Transactional Processing (OLTP) database that tracks a large volume of data transactions, and wherein the aggregated analytical query database is an Online Analytical Processing (OLAP) database comprising aggregated queries and a low volume of data transactions relative to the OLTP database.

7. The method of claim 6, further comprising:

receiving a query and determining whether the query is an OLTP query or an OLAP query.

8. The method of claim 7, further comprising: in response to determining the query is a OLAP query, directing the query to the OLAP database and processing the query using the second set of decoupled compute instances.

9. The method of claim 7, further comprising: in response to determining the query is a OLTP query, directing the query to the OLTP database and processing the query using the first set of decoupled compute instances.

10. The method of claim 1, wherein the execution node comprises a processor and a cache, the first set of decoupled compute instances are remotely connected over a network to the first set of decoupled storage instances of the transaction processing database, and wherein the second set of decoupled compute instances are remotely connected over the network to the second set of decoupled storage instances of the aggregated analytical query database.

11. A system comprising:

at least one hardware processor; and memory storing instructions that, when executed by the at least one hardware processor, cause the at least one hardware processor to perform operations comprising:

assigning, by a first cluster, a session of a client device to a first set of decoupled compute instances, the first cluster, prior to assigning the session, receiving a request from the client device to use the first set of decoupled compute instances, each of the decoupled compute instances comprising an execution node, the execution node being included in a second cluster that is separate from the first cluster;

after assigning the session, receiving from the client device, by the first set of decoupled compute instances, a plurality of transactional queries against a transactional processing database stored on a first set of decoupled storage instances, at least one of the first set of decoupled compute instances bypassing a compiler to process at least one transactional query from the plurality of transactional queries using locally cached data in a cache provided by the second cluster;

determining, by the second cluster, that a compiled execution plan of statements, corresponding to a particular transactional query from the plurality of transactional queries, does not exist in the cache provided by the second cluster;

sending, by the second cluster, the particular transactional query to a third cluster for compiling and generating an execution plan of the particular transactional query, the third cluster being separate from the first cluster and the second cluster, wherein the second cluster processes OLTP traffic and performs OLTP operations on transactional data stores, and the third cluster includes SQL compiler functionality for generating query plans, the clusters being implemented with separate compute nodes;

receiving at least one select query for processing on an aggregated analytical query database, the aggregated analytical query database included in the third cluster that is separate from the first cluster and the second cluster;

generating, by the compiler included in the third cluster, a query plan for execution of the at least one select query using a second set of decoupled compute instances; and generating, by the second set of decoupled compute instances, an aggregated analytical query result dataset for the at least one select query according to the query plan.

12. The system of claim 11, wherein the operations further comprise:

receiving a transactional query for processing on transactional data in the transactional processing database;

determining that the transactional data is cached on the first set of decoupled compute instances; and generating transactional results data by applying the transactional query on the transactional data, the first set of decoupled compute instances bypassing the compiler in generating the transactional results data and returning results to a client device that generated the transactional query, the bypassing comprising setting an active session between the client device and the first set of decoupled compute instances.

13. The system of claim 11, wherein the operations further comprise: replicating data that has changed from the transactional processing database to an object store database of an aggregated analytical query database managed by the second set of decoupled compute instances.

14. The system of claim 13, wherein the aggregated analytical query database is stored on a second set of decoupled storage instances, the second set of decoupled compute instances being remote from the second set of decoupled storage instances.

15. The system of claim 11, wherein the first set of decoupled compute instances is remote from the first set of decoupled storage instances, each of the plurality of transactional queries comprising data manipulation language statements that change data in the transactional processing database.

16. The system of claim 11, wherein the transactional processing database is an Online Transactional Processing (OLTP) database that tracks a large volume of data transactions, and wherein the aggregated analytical query database is an Online Analytical Processing (OLAP) database comprising aggregated queries and a low volume of data transactions relative to the OLTP database.

17. The system of claim 16, wherein the operations further comprise:

receiving a query and determining whether the query is an OLTP query or an OLAP query.

18. The system of claim 17, wherein the operations further comprise: in response to determining the query is a OLAP query, directing the query to the OLAP database and processing the query using the second set of decoupled compute instances.

19. The system of claim 17, wherein the operations further comprise: in response to determining the query is a OLTP query, directing the query to the OLTP database and processing the query using the first set of decoupled compute instances.

20. A computer-storage medium embodying instructions that, when executed by a at least one hardware processor, cause the at least one hardware processor to perform operations comprising:

assigning, by a first cluster, a session of a client device to a first set of decoupled compute instances, the first cluster, prior to assigning the session, receiving a request from the client device to use the first set of decoupled compute instances, each of the decoupled compute instances comprising an execution node, the execution node being included in a second cluster that is separate from the first cluster;

after assigning the session, receiving from the client device, by the first set of decoupled compute instances, a plurality of transactional queries against a transactional processing database stored on a first set of decoupled storage instances, at least one of the first set of decoupled compute instances bypassing a compiler to process at least one transactional query from the plurality of transactional queries using locally cached data in a cache provided by the second cluster;

determining, by the second cluster, that a compiled execution plan of statements, corresponding to a particular transactional query from the plurality of transactional queries, does not exist in the cache provided by the second cluster;

sending, by the second cluster, the particular transactional query to a third cluster for compiling and generating an execution plan of the particular transactional query, the third cluster being separate from the first cluster and the second cluster, wherein the second cluster processes OLTP traffic and performs OLTP operations on transactional data stores, and the third cluster includes SQL compiler functionality for generating query plans, the clusters being implemented with separate compute nodes;

receiving at least one select query for processing on an aggregated analytical query database, the aggregated analytical query database included in third cluster that is separate from the first cluster and the second cluster;

generating, by the compiler included in the third cluster, a query plan for execution of the at least one select query using a second set of decoupled compute instances; and generating, by the second set of decoupled compute instances, an aggregated analytical query result dataset for the at least one select query according to the query plan.

\* \* \* \* \*